United States Patent
Zou et al.

(10) Patent No.: US 11,936,485 B2
(45) Date of Patent: Mar. 19, 2024

(54) POWER STATUS TELEMETRY FOR POWERED DEVICES IN A SYSTEM WITH POWER OVER ETHERNET

(71) Applicant: Maxim Integrated Products, Inc., San Jose, CA (US)

(72) Inventors: Gaoling Zou, San Jose, CA (US); Alberto Viviani, Mountain View, CA (US); Yangyang Wen, Austin, TX (US); Qicheng Huang, San Jose, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 254 days.

(21) Appl. No.: 17/468,026

(22) Filed: Sep. 7, 2021

(65) Prior Publication Data

US 2022/0103384 A1 Mar. 31, 2022

Related U.S. Application Data

(60) Provisional application No. 63/085,993, filed on Sep. 30, 2020.

(51) Int. Cl.
*G06F 1/26* (2006.01)
*H04B 10/80* (2013.01)
*H04L 12/10* (2006.01)
*G06F 1/3203* (2019.01)

(52) U.S. Cl.
CPC ........... *H04L 12/10* (2013.01); *H04B 10/802* (2013.01); *G06F 1/3203* (2013.01)

(58) Field of Classification Search
CPC ............... H04L 12/10; H04B 10/802
USPC .......................................... 713/300
See application file for complete search history.

(56) References Cited

U.S. PATENT DOCUMENTS

| | | | |
|---|---|---|---|
| 7,706,392 B2 | 4/2010 | Ghoshal et al. | |
| 7,797,083 B1* | 9/2010 | Brumett, Jr. | G06F 1/3296 713/322 |
| 9,787,482 B2 | 10/2017 | Milligan et al. | |
| 2007/0041387 A1* | 2/2007 | Ghoshal | H04L 12/10 370/395.52 |
| 2008/0030185 A1* | 2/2008 | Metsker | G06F 1/266 323/304 |
| 2008/0062586 A1* | 3/2008 | Apfel | H04L 12/10 361/18 |
| 2008/0175260 A1* | 7/2008 | Hussain | H04L 12/66 370/419 |
| 2012/0137144 A1* | 5/2012 | Schindler | H04L 12/10 713/300 |
| 2014/0115354 A1* | 4/2014 | Jabbaz | H04L 12/10 713/310 |

(Continued)

*Primary Examiner* — Volvick Derose
(74) *Attorney, Agent, or Firm* — Kevin E. West; Advent, LLP

(57) ABSTRACT

A powered device interface assembly includes an optocoupler and a powered device interface. The opto-coupler is electrically coupled with a microcontroller of the power device interface. The powered device interface includes a telemetry circuit coupled with the opto-coupler and configured to generate encoded telemetry information for output via a single pin of the powered device interface for transmission to the microcontroller of the powered device, wherein the opto-coupler is coupled with the single pin and is configured to electrically isolate the single pin from the microcontroller.

16 Claims, 8 Drawing Sheets

(56) References Cited

U.S. PATENT DOCUMENTS

| | | | |
|---|---|---|---|
| 2016/0036595 A1* | 2/2016 | Milligan | H04L 12/10 |
| | | | 307/1 |
| 2016/0127135 A1* | 5/2016 | Balasubramanian | H04L 12/10 |
| | | | 713/300 |
| 2017/0104421 A1* | 4/2017 | Chiu | H02M 3/33507 |
| 2018/0131182 A1* | 5/2018 | Vavilala | H04L 12/10 |
| 2019/0331741 A1* | 10/2019 | Hittel | H04L 12/10 |
| 2020/0204399 A1* | 6/2020 | Crayford | H04L 12/10 |
| 2020/0389329 A1* | 12/2020 | Jones | H04L 12/40045 |
| 2023/0199302 A1* | 6/2023 | Hellman | H04N 23/661 |
| | | | 713/300 |

* cited by examiner

US 11,936,485 B2

POWER STATUS TELEMETRY FOR POWERED DEVICES IN A SYSTEM WITH POWER OVER ETHERNET

BACKGROUND

Power over Ethernet (PoE) technology describes passing electrical power, along with data, on Ethernet cabling. Power Sourcing Equipment (PSE) provides or sources power to a Powered Device (PD) over one or more twisted pairs of cables supported by the Ethernet cable. The twisted pairs of cables can transfer power, data, or both power and data from the PSE to the PD. As capabilities of Powered Devices increase, the power demands for such devices often increase, where more twisted pairs of cables are used to transfer the power. Examples of powered devices include wireless access points, Internet Protocol (IP) telephones, IP cameras, retail sales displays, out-door units (ODU), and network routers.

DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

DETAILED DESCRIPTION

Overview

Figure 1:
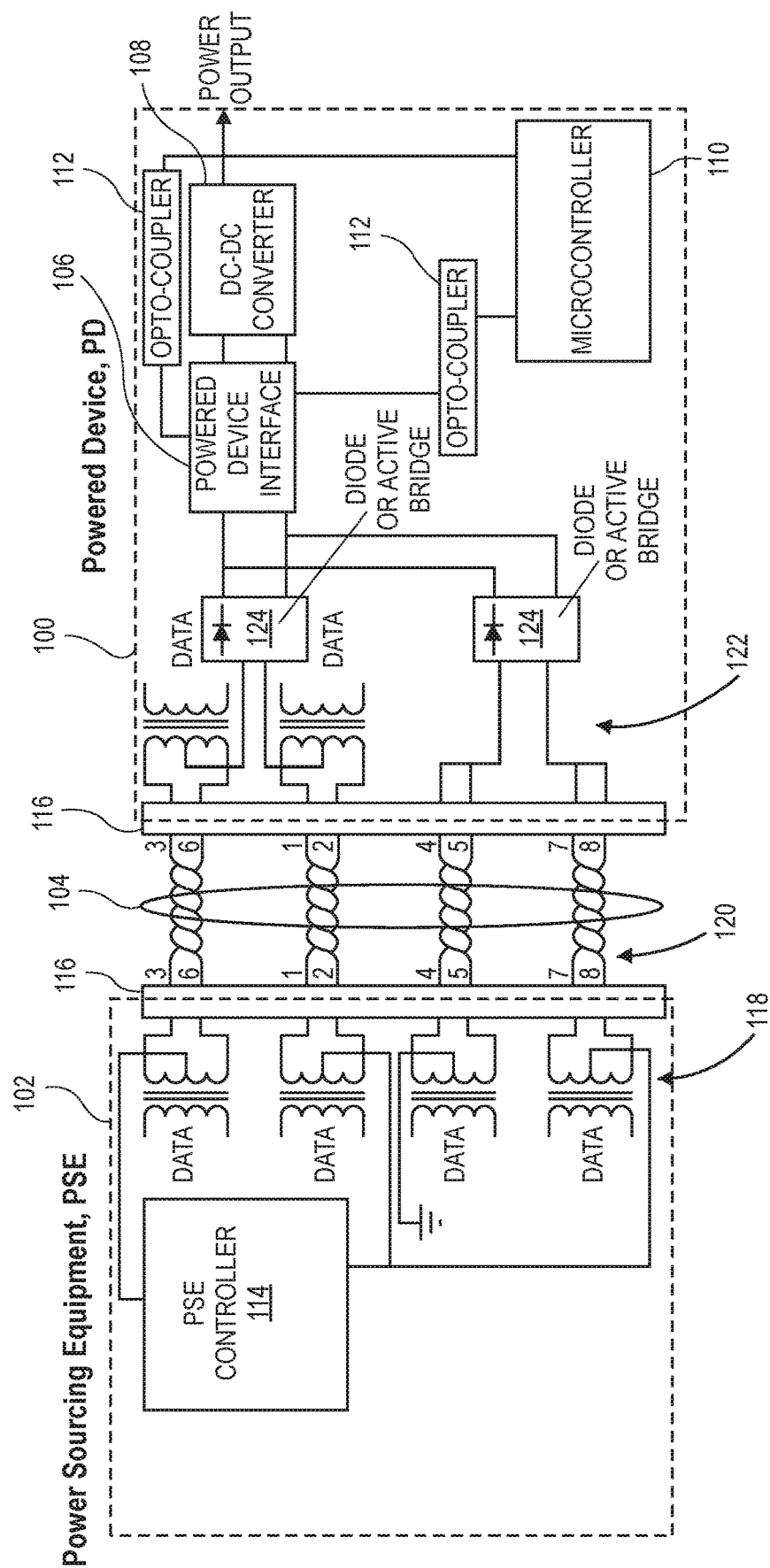
FIG. 1 is a block diagram representation of an example of a power over ethernet (PoE) system including an embodiment of a powered device interface assembly of a powered device.

Power over ethernet (PoE) systems include power sourcing equipment (PSE) connected to a powered device (PD) via Ethernet cabling that includes multiple twisted pairs of Ethernet cables over which power and data are transferred from the PSE to the PD. Such systems may be utilized for PDs that operate with data to and from a network and utilize power for sustained operations. For example, PDs that are positioned remotely from other sources of power (e.g., direct electrical power cabling to a power source or electrical power outlet) can obtain power from PSEs via the Ethernet cabling without fully depending on battery back-up or other electrical power supplies.

Power supplied by PSEs may diminish as power is transferred over Ethernet cabling due to resistive losses over the length of Ethernet cabling. In general, as the length of Ethernet cabling increases between a PSE and a PD, the more power lost during transmission to the input side of the PD. Information about PD operation becomes important as PD functionality grows. As PD power demands increase, power, current, and voltage telemetry data facilitate efficient usage of the power available for PDs from PSEs. If a PD requires more power than is available at the input side, the PSE may cease to supply power to the PD due to current protection when the PD runs in full load operation. This interruption of power supply from the PSE is disruptive for the operations of PDs, particularly those with no back-up power source.

In an embodiment, a powered device interface assembly includes and opto-coupler and a powered device interface. The opto-coupler is electrically coupled with a microcontroller of the power device interface. The powered device interface includes a telemetry circuit coupled with the opto-coupler and configured to generate encoded telemetry information for output via a single pin of the powered device interface for transmission to the microcontroller of the powered device, wherein the opto-coupler is coupled with the single pin and is configured to electrically isolate the single pin from the microcontroller.

In an embodiment, a powered device in a system employing power over ethernet includes a powered device interface, a microcontroller, and an opto-coupler. The powered device interface includes a telemetry circuit configured to generate encoded telemetry information for output via a single pin of the powered device interface. The microcontroller is coupled with the powered device interface. The opto-coupler is coupled with the single pin and is configured to electrically isolate the single pin from the microcontroller.

In an embodiment, a method for providing telemetry information from a powered device interface of a powered device in a system employing power over ethernet includes generating encoded telemetry information of the powered device via the powered device interface, outputting the encoded telemetry information via a single pin of the powered device interface, and transmitting the encoded telemetry information to a microcontroller of the powered device via an opto-coupler configured to electrically isolate the single pin from the microcontroller.

Example Implementations

Referring to FIG. 1, a block diagram representation of a powered device (PD) 100 coupled with power sourcing equipment (PSE) 102 by an Ethernet cable 104 is shown. The PSE 102 supplies power and data to the PD 100 via the Ethernet cable 104. An example of the PSE 102 includes, but is not limited to, a network switch. Examples of the PD 100 include, but are not limited to, wireless access points, Internet Protocol (IP) telephones, IP cameras, retail sales displays, out-door units (ODU), and network routers. The PD 100 includes a powered device interface 106, a voltage converter 108 (shown in FIG. 1 as an example of a DC-DC converter), and a microcontroller 110 to manage operations of the PD 100 responsive to power received from the PSE 102.

The PSE 102 includes a PSE controller 114 configured to send power and data to the PD 100 over the Ethernet cable 104. The Ethernet cable 104 is coupled between connectors 116 of the PSE 102 and the DP 100. An example of the connectors 116 includes, but is not limited to, an RJ45 connector. The PSE controller 114 outputs data and power through connections 118 to the connector 116 of the PSE 102 where pairs of twisted cables 120 transfer the data and power to the connector 116 of the PD 100. The PD 100 includes connections 122 coupled to the connector 116 to receive the power and data transferred through the pairs of twisted cable 120 of the Ethernet cable 104. The connections 118 and 122 can include, but are not limited to, transducers and electrical wiring. The PD 100 includes a diode or active bridge 124 coupled between the connections 122 and the powered device interface 106.

The powered device interface 106 includes a plurality of pins to output and receive electrical signals associated with operation of the PD 100. One or more opto-couplers 112 are coupled between the powered device interface 106 and the microcontroller 110 to electrically isolate the powered device interface 106 from the microcontroller 110. The PD 100 shown in FIG. 1 is shown with two opto-couplers 112: a first opto-coupler 112 coupled between a first pin of the powered device interface 106 and the microcontroller 110 and a second opto-coupler 112 coupled between a second pin of the powered device interface 106 and the microcontroller 110.

The powered device interface 106 generates telemetry information for output via a single pin of the powered device interface 106 for transmission to the microcontroller 110 of the PD 100. The telemetry information generated by the powered device interface 106 relates to front end states of power, voltage, current, or combinations thereof. In an embodiment, the powered device interface 106 includes a telemetry circuit to generate encoded telemetry information for output via the single pin of the powered device interface 106 for transmission to the microcontroller 110. The telemetry information can include, but is not limited to, a real time state of the powered device corresponding to power, voltage, current, or combinations thereof. In an embodiment, the telemetry information is output via the single pin with an 8-bit telemetry report. The telemetry information can be encoded via one or more encoding methods, including, but not limited to, pulse width modulation and pulse code modulation.

In an embodiment, the single pin of the powered device interface 106 used to output the encoded telemetry information is also used to transmit non-telemetry data to the microcontroller 110. For example, the same pin may be used to transmit classification results indications to the microcontroller 110 in addition to power, voltage, and current status information. In an embodiment, the encoded telemetry information includes a start pulse width, a first data pulse width, and a second data pulse width, with each pulse width being recognizable by the microcontroller 110 to decode data from the signal output via the single pin. For example, the start pulse width can be approximately ninety percent (90%) of a single signal frequency, the first data pulse width is approximately fifty percent (50%) of the single signal frequency, and the second data pulse width is approximately seventy-five percent (75%) of the single signal frequency, however the values for the pulse widths are not limited to the example values listed and can include values that exceed or are less than the values listed. An example signal frequency includes, but is not limited to, approximately one kilohertz (kHz). As used herein, the term "approximately" includes the stated values and functional equivalents thereof.

In an embodiment, the microcontroller 110 generates power limit information, current limit information, or combinations thereof for transmission to a second pin of the powered device interface 106. The second pin is electrically isolated from the microcontroller 110 by one of the opto-couplers 112. The power limit information is configured to control an amount of power utilized by the PD 100. The current limit information is configured to control an amount of current drawn by the PD 100. In an embodiment, the microcontroller 110 generates the power limit information, current limit information, or combinations thereof subsequent to operation of the PD 100 via power received from the PSE 102 over the Ethernet cable 104. For example, the power limit information, current limit information, or combinations thereof can be in response to requests from the PD 100 to enable additional functionality where additional power may be available from the PSE 102. In an embodiment, the microcontroller 110 generates the current limit information in response to an increase in power demand by the microcontroller 110, such as to increase functionalities of the PD 100. The power limit information can be differentiated from the current limit information by differences in the signal output from the microcontroller 110. In an embodiment, the power limit information includes a first pulse pattern as signature and reference that differs from a second pulse pattern as signature and reference for the current limit information. The power limit information and the current limit information can include identifiable gaps between frames. For example, the gap can include a pulse width that is at least twice the width of a pulse framerate.

Figure 2:
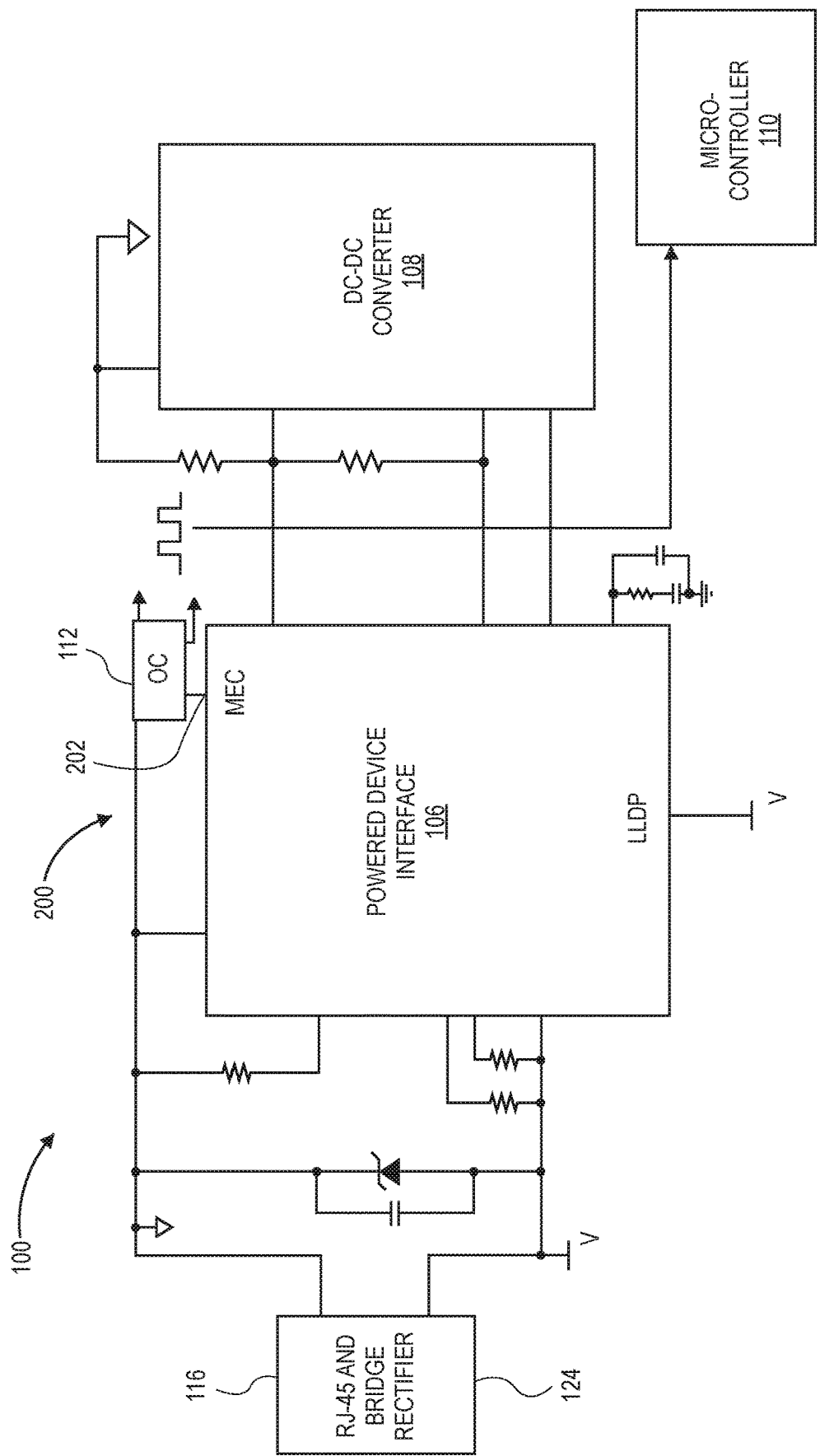
FIG. 2 is a block diagram representation and circuit diagram of an example of a PoE system including an embodiment of a powered device interface assembly of a powered device.

Referring to FIG. 2, a block diagram representation and circuit diagram of an example of a PoE system including an embodiment of a powered device interface assembly 200 of the PD 100 is shown. The powered device interface assembly 200 includes the powered device interface 106, a pin 202 (labeled "MEG"), and an opto-coupler 112 coupled with the pin 202. The powered device interface 106 is electrically coupled with the connector 116 and the diode or active bridge 124 to receive power from the PSE 102 through the Ethernet cable 104. The powered device interface 106 is electrically coupled with the voltage converter 108 to provide power for usage by the PD 100. The opto-coupler 112 electrically isolates the pin 202 from the microcontroller 110 by converting electrical signals output from the pin 202 to optical signals and then converting the optical signals back to electrical signals for transfer to the microcontroller 110. In an embodiment, the powered device interface 106 includes a telemetry circuit to generate the encoded telemetry information for output via the pin 202 of the powered device interface 106 for transmission to the microcontroller 110.

Figure 3:
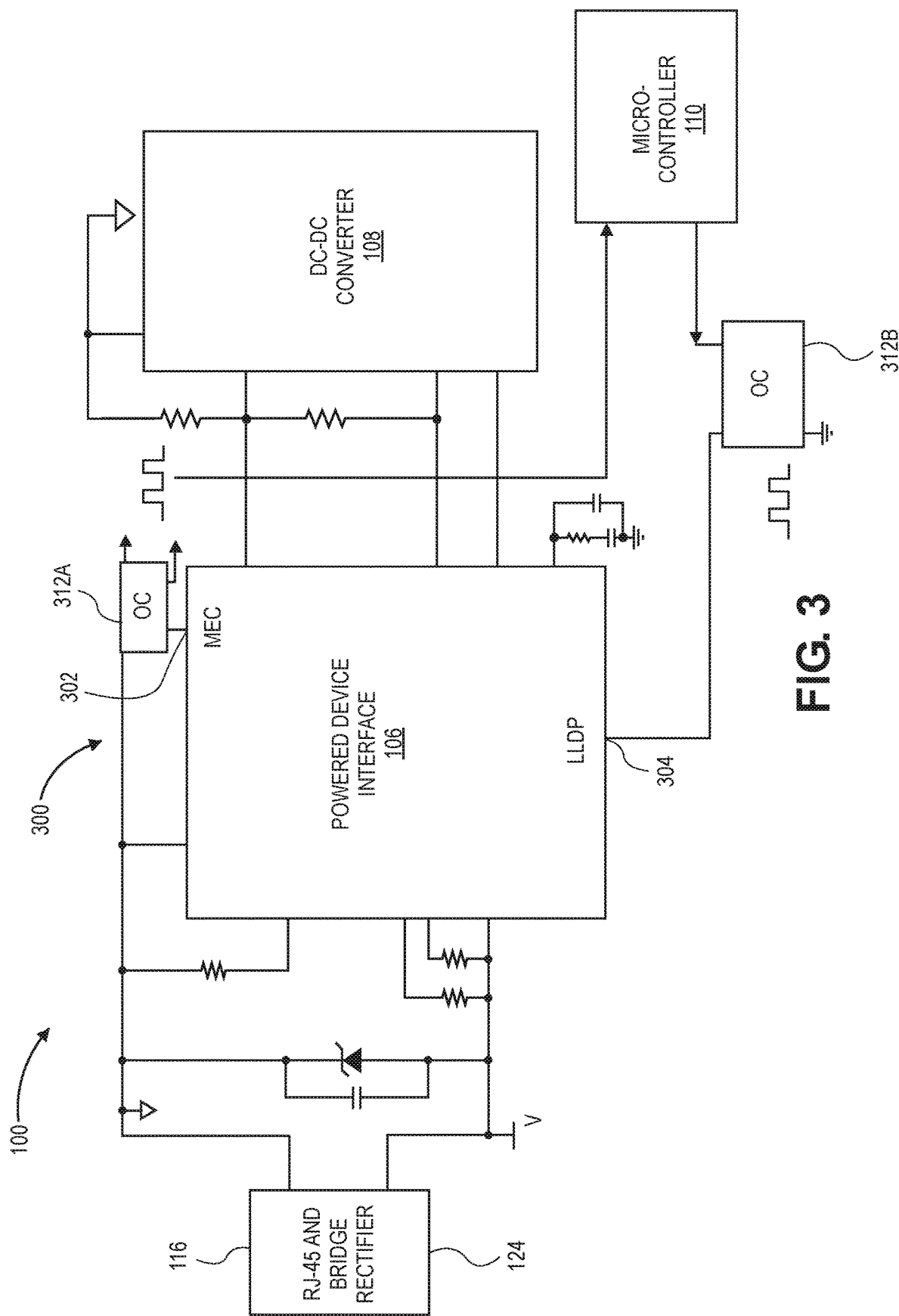
FIG. 3 is a block diagram representation and circuit diagram of an example of a PoE system including an embodiment of a powered device interface assembly of a powered device.

Referring to FIG. 3, a block diagram representation and circuit diagram of an example of a PoE system including an embodiment of a powered device interface assembly 300 of the PD 100 is shown. The powered device interface assembly 300 includes the powered device interface 106, a first pin 302 (labeled "MEG"), a second pin 304 (labeled "LLDP"), a first opto-coupler 312A coupled with the first pin 302, and a second opto-coupler 312B coupled with the second pin 304. The powered device interface 106 is electrically coupled with the connector 116 and the diode or active bridge 124 to receive power from the PSE 102 through the Ethernet cable 104. The powered device interface 106 is electrically coupled with the voltage converter 108 to provide power for usage by the PD 100. The first opto-coupler 312A electrically isolates the first pin 302 from the microcontroller 110 by converting electrical signals output from the first pin 302 to optical signals and then converting the optical signals back to electrical signals for transfer to the microcontroller 110. In an embodiment, the powered device interface 106 includes a telemetry circuit to generate the encoded telemetry information for output via the first pin 302 of the powered device interface 106 for transmission to the microcontroller 110. The second opto-coupler 312B electrically isolates the second pin 304 from the microcontroller 110. In an embodiment, the microcontroller 110 generates power limit information, current limit information, or combinations thereof for transmission to the second pin 302 via the second opto-coupler 312B.

Figure 4:
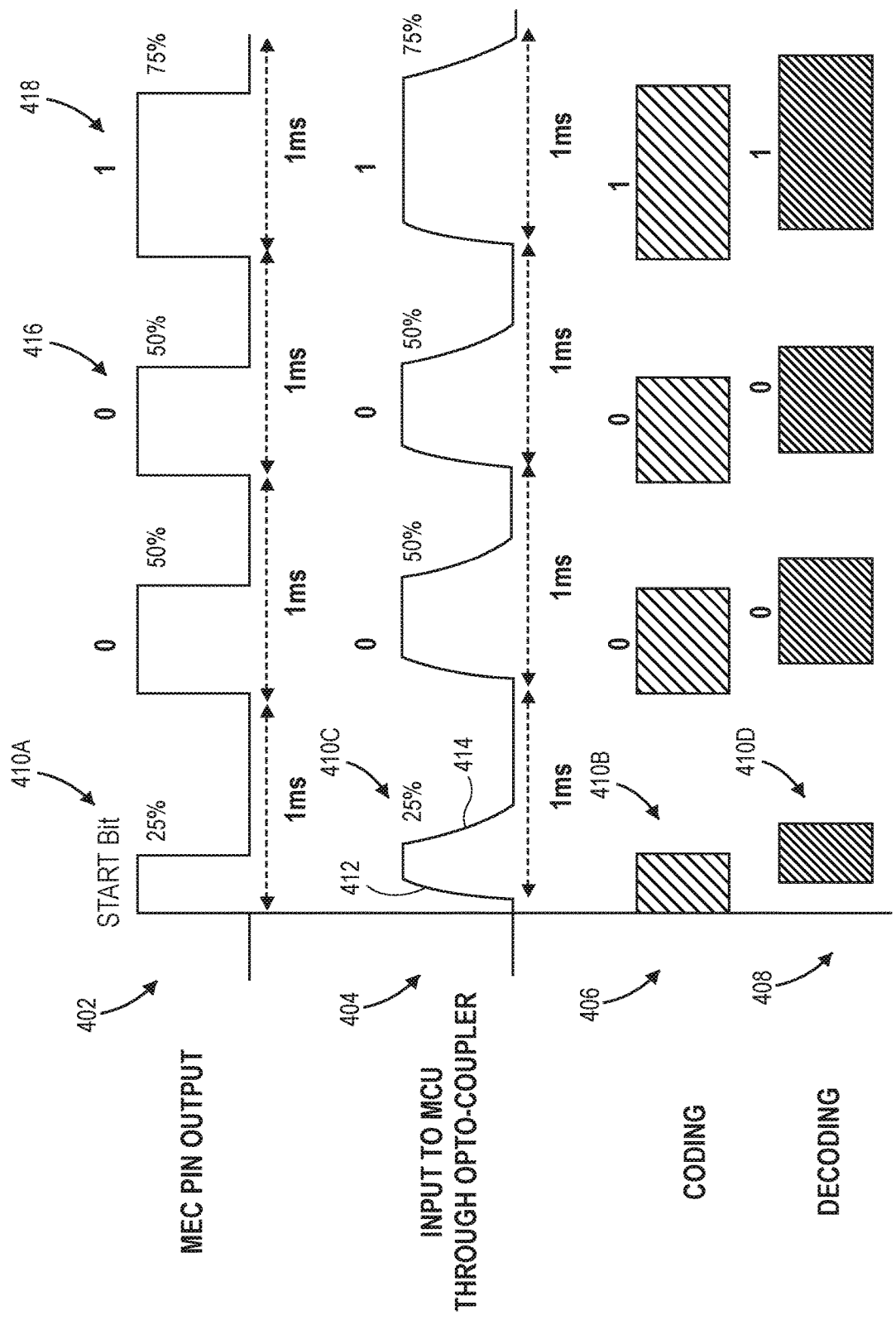
FIG. 4 is a chart showing a signal output from a single pin of a powered device interface, a microcontroller signal input of the signal output through an opto-coupler, and the respective coding and decoding of the signals.

Referring to FIG. 4, a chart showing a signal output from a single pin of a powered device interface (shown as 402), a microcontroller signal input of the signal output through an opto-coupler (shown as 404), and the respective coding (shown as 406) and decoding (shown as 408) of the signals is shown. In an embodiment, the signal output 402 can be attributed to signal output from a single pin of the powered device interface 106, such as the pin 202 or the first pin 302. In an embodiment, the signal input 404 can be attributed to signal received by the microcontroller 110 from the powered device interface via the opto-coupler (e.g., opto-coupler 112, opto-coupler 312A). The signal frequency for the signal output 402, the signal input 404, or combinations thereof can include, but is not limited to, approximately one kilohertz (1 kHz).

The signal output 402 includes a start bit 410A to signal to the microcontroller 110 the reference of the signal. The coding of the start bit is shown as 410B. The signal input 404 from the opto-coupler includes a rising edge 412 and a falling edge 414 and is shown as 410C. In an embodiment, the distance between the top of the rising edge 412 and the bottom of the falling edge 414 corresponds to the pulse width of the signal output 402. For example, the decoding of the start bit is shown as 410D and matches the coding 410B with a time delay therebetween. The output signal 402 also includes a first data pulse width 416 and a second data pulse width 418. In an embodiment, the first data pulse width 416 represents "0" and the second data pulse width 418 represents "1". The start bit 410A, the first data pulse width 416, and the second data pulse width 418 are distinct from each other to be recognizable at the microcontroller 110 following transfer through the opto-coupler 112. For example, the start bit 410A pulse width can be approximately twenty-five percent (25%) of a single signal frequency, the first data pulse width 416 can be approximately fifty percent (50%) of the single signal frequency, and the second data pulse width 418 can be approximately seventy-five percent (75%) of the single signal frequency, however the values for the pulse widths are not limited to the example values listed and can include values that exceed or are less than the values listed.

Figure 5:
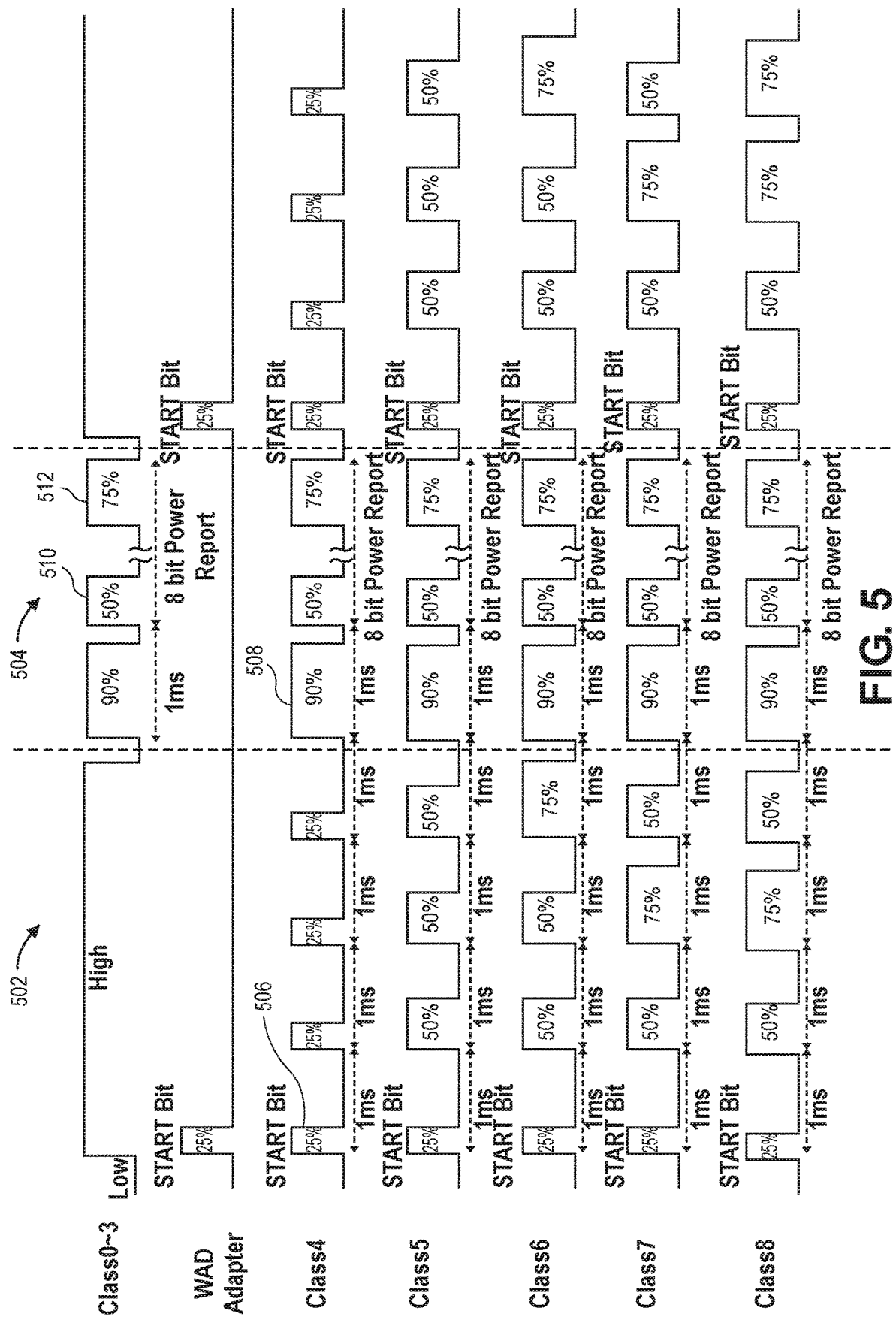
FIG. 5 is a chart showing example signal outputs from a powered device interface for power telemetry for multiple classes over a single pin.
Figure 6:
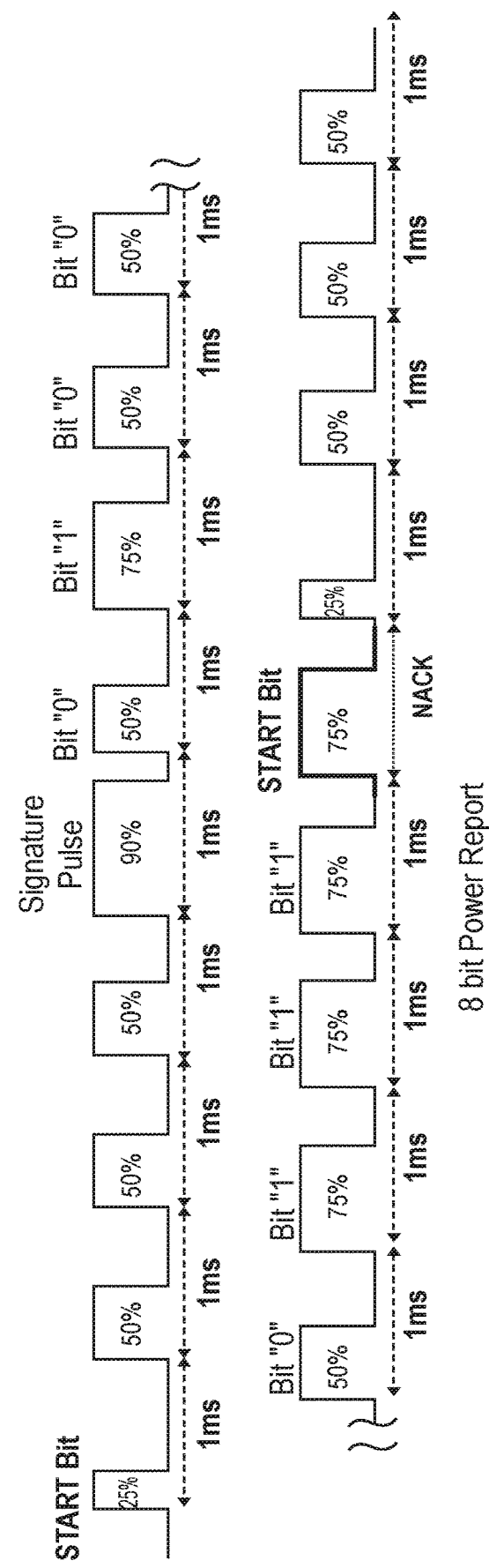
FIG. 6 is a chart showing an example signal output from a powered device interface for power telemetry for one class over a single pin.

Referring to FIG. 5, a chart showing example signal outputs from the powered device interface 106 to the microcontroller 110 for power telemetry for multiple classes over a single pin is shown. The signals include a first frame 502 providing for PSE type indication and a telemetry portion 504 providing the telemetry data. In an embodiment, the start bit 506 for the first frame 502 differs from the start bit 508 of the telemetry portion 504 based on pulse width. For example, the start bit 506 for the first frame 502 can include, but is not limited to, a pulse width of approximately twenty-five percent (25%) of a single signal frequency and the start bit 508 of the telemetry portion 504 can include, but is not limited to, a pulse width of approximately ninety percent (90%) of a single signal frequency. The telemetry portion 504 also includes a first data pulse width 510 and a second data pulse width 512, with each pulse width being recognizable by the microcontroller 110 to decode data from the signal output via the single pin. For example, the first data pulse width 510 is approximately fifty percent (50%) of the single signal frequency and the second data pulse width 512 is approximately seventy-five percent (75%) of the single signal frequency, however the values for the pulse widths are not limited to the example values listed and can include values that exceed or are less than the values listed. In an embodiment, the first data pulse width 510 represents "0" and the second data pulse width 512 represents "1". In an embodiment, the telemetry portion 504 is output via a single pin of the powered device interface 106 with an 8-bit telemetry report. In an embodiment, the telemetry portion 504 includes an ACK signal portion or a NACK portion to acknowledge signals received from the microcontroller 110 related to power limit information, current limit information, or combinations thereof, and example of which is shown in FIG. 6.

Figure 7:
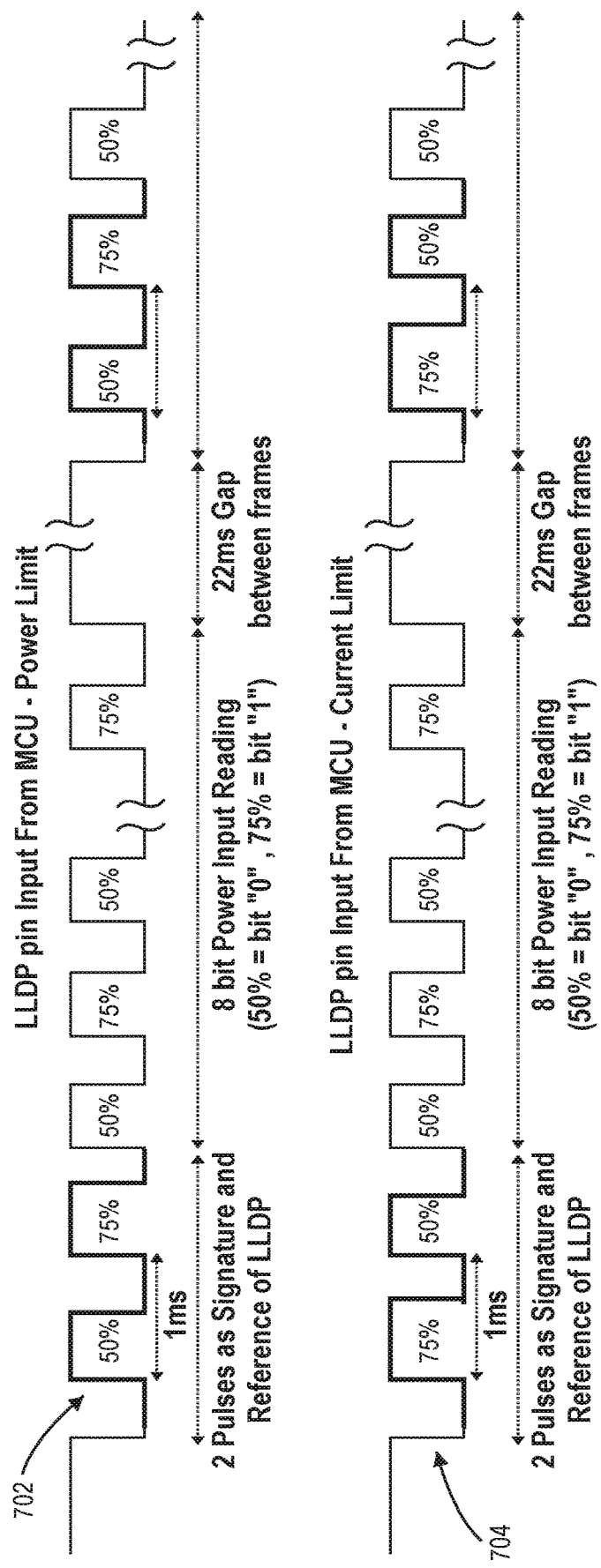
FIG. 7 is a chart showing example signal inputs at a powered device interface for signals from a microcontroller of the powered device.

Referring to FIG. 7, a chart showing example signal inputs at the powered device interface 106 for signals from the microcontroller 110 of the PD 100. For example, the signal inputs can include signal inputs associated with power limit information, current limit information, or combinations thereof, sent by the microcontroller 110 through the opto-coupler 312B to the second pin 304 of the powered device interface 106. An example power limit information signal input is shown as 702 and an example current limit information signal input is shown as 704. The power limit information signal input 702 includes a pulse pattern as a signature and reference for the power limit information that is distinct from the pulse pattern for the signature and reference for the current limit information signal input 704. In an embodiment, the pulse pattern includes two pulses having a first pulse width and a second pulse width that differs from the first pulse width. For example, the power limit information signal input 702 includes a pulse pattern have a 50% pulse width followed by a 75% pulse width and the current limit information signal input 704 includes a pulse pattern have a 75% pulse width followed by a 50% pulse width. In an embodiment, the power limit information signal input 702 and the current limit information signal input 704 includes a gap 706 between frames. The gap 706 can include, but is not limited to a gap that is at least twice the width of a pulse framerate. For example, for a one kilohertz (1 kHz) framerate, the gap 706 can include, but is not limited to, a twenty-two millisecond (22 ms) gap. In an embodiment, the microcontroller 110 of the PD 100 provides signal pulses to the second pin 304 of the powered device interface 106 in situations where the system 100 should change either the power limit or the current limit, such that the microcontroller 110 does not provide the signal pulses in a continuous manner.

Figure 8:
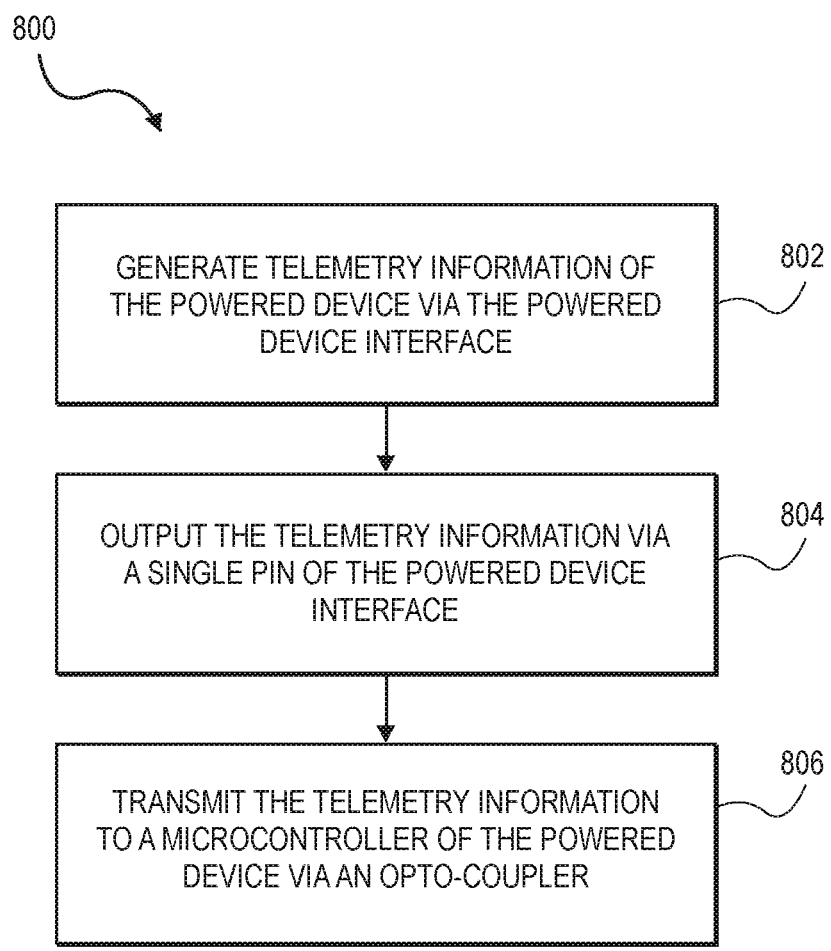
FIG. 8 is a flow chart representation of a method of implementing an embodiment of providing telemetry information from a powered device interface in a PoE system.

Referring to FIG. 8, a flow chart representation of a method 800 of implementing an embodiment of providing telemetry information from a powered device interface in a PoE system is shown. At 802, encoded telemetry information of the powered device is generated via the powered device interface. For example, the powered device interface 106 generates encoded telemetry information regarding a real time state of power, current, voltage, or combinations thereof. The encoded telemetry information is output via a single pin of the powered device interface at 804. For example, the pin 202 or the first pin 302 of the powered device interface 106 can output the encoded telemetry information. The encoded telemetry information is transmitted to a microcontroller of the powered device via an opto-coupler at 806. For example, the opto-coupler 112 or 312A can electrically isolate the microcontroller 110 from the pin 202 or the first pin 302 and transmit the encoded telemetry information from the pin 202 or the first pin 302 to the microcontroller 110.

While a series of steps have been described in connection with the method 800, a fewer number of the described steps and/or additional steps may be performed. Furthermore, while the steps have been described in a particular order, the steps in method 800 may be performed in a different order.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A powered device interface assembly for a powered device in a system employing power over ethernet, the powered device interface comprising:
   an opto-coupler electrically coupled with a microcontroller of the powered device interface; and
   a telemetry circuit coupled with the opto-coupler and configured to generate encoded telemetry information for output via a single pin of the powered device interface for transmission to the microcontroller of the powered device, the encoded telemetry information including a start pulse width, a first data pulse width, and a second data pulse width, wherein each of the start pulse width, the first data pulse width, and the second data pulse width differs from each other of the start pulse width, the first data pulse width, and the second data pulse width, and wherein the opto-coupler is coupled with the single pin and is configured to electrically isolate the single pin from the microcontroller.

2. The powered device interface assembly of claim 1, wherein the encoded telemetry information is associated with a real time state of the powered device corresponding to at least one of power, voltage, or current.

3. The powered device interface assembly of claim 1, wherein the start pulse width is approximately ninety percent (90%) of a single signal frequency.

4. The powered device interface assembly of claim 3, wherein the first data pulse width is approximately fifty percent (50%) of the single signal frequency.

5. The powered device interface assembly of claim 4, wherein the second data pulse width is approximately seventy-five percent (75%) of the single signal frequency.

6. The powered device interface assembly of claim 3, wherein the single signal frequency is approximately one kilohertz (kHz).

7. A powered device in a system employing power over ethernet, the powered device comprising:
   a powered device interface including a telemetry circuit configured to generate encoded telemetry information for output via a single pin of the powered device interface;
   a microcontroller coupled with the powered device interface;
   an opto-coupler coupled with the single pin, the opto-coupler configured to electrically isolate the single pin from the microcontroller; and
   a second opto-coupler coupled between the microcontroller and a second pin of the powered device interface, the second opto-coupler configured to electrically isolate the second pin from the microcontroller.

8. The powered device of claim 7, wherein the microcontroller is configured to generate at least one of power limit information or current limit information for transmission to the second pin via the second opto-coupler.

9. The powered device of claim 8, wherein the microcontroller is configured to generate the at least one of power limit information or current limit information subsequent to operation of the powered device via power received from power supply equipment over an ethernet cable.

10. The powered device of claim 8, wherein the microcontroller is configured to generate the current limit information in response to an increase in power demand by the microcontroller.

11. The powered device of claim 8, wherein the microcontroller is configured to generate each of the power limit information and the current limit information.

12. The powered device of claim 11, wherein the power limit information includes a first pulse pattern as signature and reference that differs from a second pulse pattern as signature and reference for the current limit information.

13. The powered device of claim 8, wherein at least one of the power limit information or the current limit information includes a gap between frames, wherein the gap is at least twice the width of a pulse framerate.

14. The powered device of claim 7, wherein the encoded telemetry information is associated with a real time state of the powered device corresponding to at least one of power, voltage, or current.

15. A method for providing telemetry information from a powered device interface of a powered device in a system employing power over ethernet, the method comprising:
   generating encoded telemetry information of the powered device via the powered device interface;
   outputting the encoded telemetry information via a single pin of the powered device interface, the encoded telemetry information including a start pulse width, a first data pulse width, and a second data pulse width, wherein each of the start pulse width, the first data pulse width, and the second data pulse width differs from each other of the start pulse width, the first data pulse width, and the second data pulse width; and
   transmitting the encoded telemetry information to a microcontroller of the powered device via the single pin.

16. The method of claim 15, further comprising:
   generating, via the microcontroller, at least one of power limit information or current limit information; and
   transmitting the at least one of power limit information or current limit information to a second pin of the powered device interface.

* * * * *